United States Patent [19]

Swillinger et al.

[11] 4,224,460

[45] Sep. 23, 1980

[54] ELECTRODE HEATING DEVICE FOR USE IN GLASS MELTING FURNACES

[75] Inventors: James W. Swillinger, Oregon, Ohio; Thomas F. Stark, Littleton, Colo.

[73] Assignee: Libbey-Owens-Ford Company, Toledo, Ohio

[21] Appl. No.: 1,356

[22] Filed: Jan. 5, 1979

[51] Int. Cl.[3] .................... C03B 5/02

[52] U.S. Cl. .................... 13/6

[58] Field of Search .................... 13/6, 23, 25; 65/DIG. 4, DIG. 6, 335

[56] References Cited

U.S. PATENT DOCUMENTS

| | | | |
|---|---|---|---|
| 2,591,709 | 4/1952 | Lubatti | 13/6 UX |
| 2,817,695 | 12/1957 | Hartwing | 13/23 X |
| 2,953,614 | 9/1960 | Holden | 13/23 |
| 2,978,526 | 4/1961 | Olson . | |
| 3,105,865 | 10/1963 | Rosseau | 13/6 X |
| 3,983,309 | 9/1976 | Faulkner et al. | 13/23 X |
| 4,069,032 | 1/1978 | Brax . | |

*Primary Examiner*—Roy N. Envall, Jr.

*Attorney, Agent, or Firm*—Collins, Oberlin & Darr

[57] ABSTRACT

An expendable heating device having a consumable electrode for extending into a bath of molten glass. The apparatus includes an L-shaped refractory holder whose longer leg is adapted to sit on the top of a wall such as that of a feeding extension or doghouse of a tank type glass melting furnace and whose shorter leg projects into the bath of molten glass for forming a protective jacket for the consumable electrode. The long leg of the refractory holder encases a bus bar which projects from the end thereof, the projecting end of the bus bar being adapted to be connected to a source of electrical energy. The bus bar is held in place within the long leg of the holder by a pair of clamping devices.

7 Claims, 3 Drawing Figures

ELECTRODE HEATING DEVICE FOR USE IN GLASS MELTING FURNACES

BACKGROUND OF THE INVENTION

1. Field of the Invention

This invention relates generally to an electrode apparatus for use in a continuous glass melting furnace and, more particularly, to an easily replaceable electrode device which extends into an open top portion of a tank type glass melting furnace.

2. Description of the Prior Art

In melting glass making materials in conventional continuous tank type furnaces, considerable difficulty has been encountered in obtaining uniform melting of the materials and utilizing the maximum efficiency of the heat supply because of the normal practice of supplying heat from overhead flames to melt the raw materials and refine the melted materials at elevated temperatures. In this process, raw batch material and scrap glass or cullet are charged into one end of the furnace and molten glass is removed from its other end. The glass, in moving through the furnace, passes successively through melting, fining and cooling areas which are contiguous with one another. Heat is applied over the upper surface of the bath of glass in both the melting and fining areas.

In such a furnace, the charging of relatively cold glass making materials into the charging end of the furnace, creates a problem in producing a homogeneous bath of molten glass since the batch materials are cold. In this process, a blanket of unmelted batch materials lies on top of the molten materials at the charging end of the furnace and, at times, when the quantity of glass being produced is large, the rate of feeding cold batch material into the charging end of the furnace may reach a stage where the molten glass materials therein become unduly cold and may even cause the molten materials to "freeze" or "solidify", particularly along the walls defining the open charging end. This, of course, disrupts the effective circulation of the molten glass below the cold blanket and interferes with the homogenity of the molten glass bath in the furnace.

In order to overcome this problem, auxiliary heating devices, such as heating electrodes have been provided within the charging end of the furnace to supply additional heat and thereby maintain the temperature of the molten bath materials at a level where the effective circulation of molten glass occurs.

Heretofore, heating electrodes have been placed in the side walls or floor of the charging area or doghouse. Conventionally, holes are drilled in the refractory side and rear walls of the doghouses and electrodes having water cooled jackets are inserted through the holes into the bath of molten glass. As the electrodes burn off within the molten glass, new sections are added at the rear end and they are driven through the water cooled jackets. However, the electrodes have a tendency to corrode within the jackets and it thus becomes very difficult to change them. In addition, the water cooled jackets frequently spring leaks, causing serious difficulty including, at times, complete "freezing" of the molten glass bath within the doghouse. This, of course, creates a problem of removing the solidified glass from the charging area of the furnace.

Also, since such heating electrodes are fixedly positioned within the charging end of the furnace, a plurality of electrodes is required to provide flexibility in the temperature distribution therein for overcoming localized cool areas occurring in the doghouse.

SUMMARY OF THE INVENTION

Generally speaking, the present invention overcomes the aforementioned problems by providing heating devices which do not require cooling, such as by water or air, and which can be used in pairs that are selectively positionable around the walls of the doghouse area for providing heat in localized cool areas occurring along the walls of the doghouse. More specifically, the heating device includes an electrode which is incorporated into an L-shaped refractory holder which is adapted to extend over the top of the doghouse wall with its short leg projecting vertically into the bath of molten glass and its long leg resting horizontally on the doghouse wall. The short leg is provided with a vertical aperture through which a consumable electrode extends down into the bath of molten glass. A bus bar extends from the electrode along a recess provided in the horizontal leg of the holder for connection to an electrical power source remote from the doghouse area. Above the bus bar the recess is filled with a refractory cement, and the bus bar is wrapped with an insulating tape beyond the end of the refractory holder.

OBJECTS AND ADVANTAGES

An object of this invention is to provide an improved heating device wherein an electrode depends downwardly and into the bath of molten glass and the electrode at its juncture with the molten glass, is protectively encased.

Another object of the invention is to provide a heating device which is selectively positionable around the walls of the doghouse area.

Yet another object of this invention is to provide a heating device which is simple in construction, inexpensive to manufacture and easily replaceable.

Other objects and advantages of the invention will become more apparent during the course of the following description, when read in conjunction with the accompanying drawing.

BRIEF DESCRIPTION OF THE DRAWING

In the drawing, wherein like numerals are employed to designate like parts throughout the same.

DESCRIPTION OF THE PREFERRED EMBODIMENT

Figure 1:
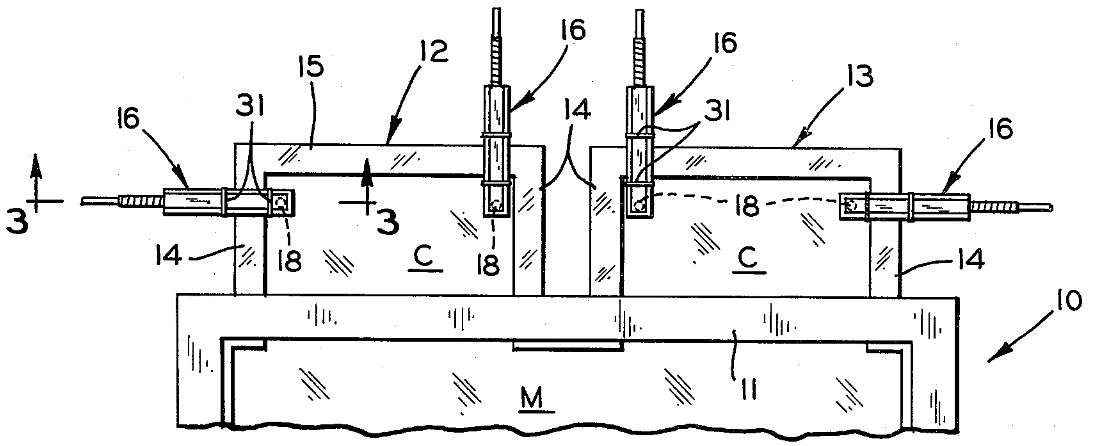
FIG. 1 is a plan view of the charging end of a glass melting furnace incorporating the heating device constructed in accordance with the invention.

Referring now to the drawing, particularly to FIG. 1, there is illustrated the charging end of a glass melting furnace containing a body of molten glass and generally designated by the reference numeral 10, and including a glass melting zone M having an end wall 11. Opening outwardly from the end wall 11 are spaced charging or doghouse areas 12 and 13, each doghouse area being defined by side walls 14 and an end wall 15. As is customary with this type of glass melting furnace, glass batch materials are deposited upon the molten glass bath within the doghouse areas as at C, moved forwardly into the melting zone M of the furnace 10 where they are reduced to a molten consistency and integrated into the molten bath. The molten glass flows successively into and through refining and cooling zones (not shown) for conditioning, and the properly conditioned glass is discharged through an orifice in the outlet end wall (not shown) of the furnace.

Generally, the glass making materials consisting of proportionate amounts of raw pulverulent or granular batch material and scrap or cullet glass are supplied to the charging area C in a manner such that a relatively cool blanket of unmelted batch materials is built upon the upper level of surface L of the molten glass G in each doghouse 12 and 13, substantially crosswise thereto between the side walls 14. The rate at which the batch materials and cullet glass are supplied to the furnace from both of the doghouses is coordinated with the production demand of the furnace. Thus, the rate of charging relatively cool batch materials into the doghouses establishes varying temperatures in the molten glass bath and creates changing localized cool areas within the bath of molten glass.

In order to provide additional heat to the localized cool areas in the bath of molten glass in the doghouses 12 and 13, the cool areas are heated by auxiliary electrical heating means utilizing Joule effect currents in the molten glass. Accordingly, auxiliary heat is applied in the doghouses by placing at least two electrodes in the bath of molten glass and connecting the electrodes to a source of electrical current. As contemplated by this invention, each novel heating device, designated in its entirety by the reference numeral 16, is adapted to be selectively placed on the top of the doghouse side or end walls 14 and 15, respectively, so as to permit changing of the location of the heating area in the body of molten glass within the doghouses.

Figure 3:
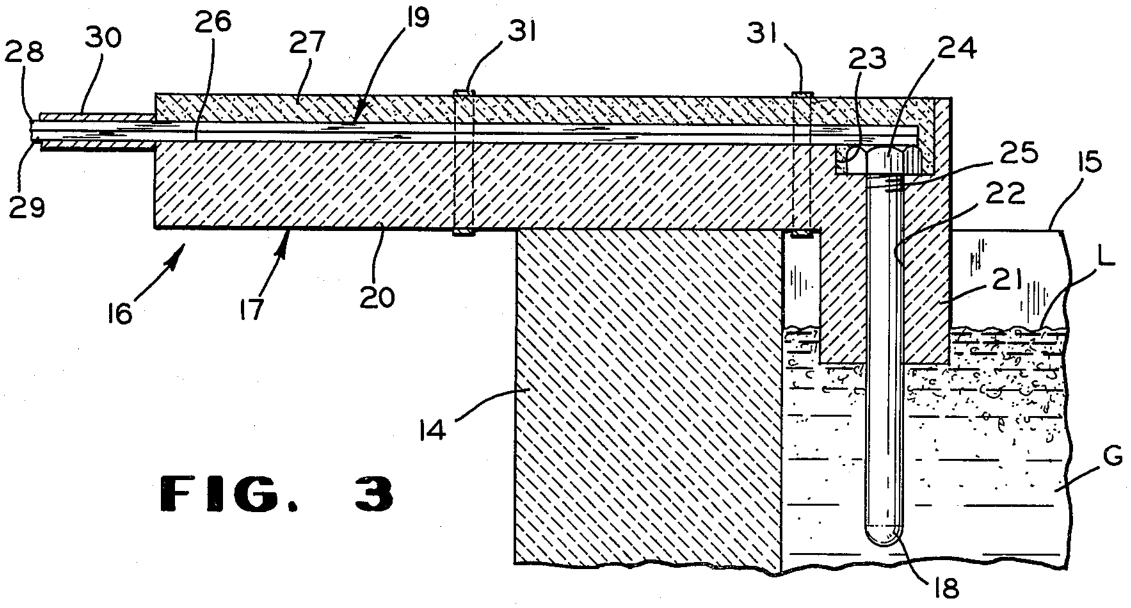
FIG. 3 is an enlarged cross sectional view taken substantially along line 3—3 in FIG. 1, particularly illustrating the refractory holder of the heating device.

Each heating device 16 includes an L-shaped holder 17 comprising a supporting member which encases an elongated consumable electrode 18 and a bus bar 19. Referring now to FIG. 3, the L-shaped holder 17 is formed of ceramic or refractory materials, such as fused silica, which are able to withstand direct exposure to molten glass for extended periods of time and has a long horizontally extending leg 20 and a short vertically extending leg 21. The short leg 21 is provided with a central aperture 22, one end of which is provided with an enlarged bore 23 for receiving a nut 24 attached, as by welding, to the bus bar 19 which is preferably formed of copper material. One end of the electrode 18 is provided with threads 25 for threaded attachment to the nut 24. As best illustrated in FIG. 3, the electrode 18 is received within the central aperture 22 and projects beyond the end of the short leg 21 of the holder 17 a suitable distance into the bath of molten glass. A groove 26 is provided in the top surface of the long leg 20 for receiving the bus bar 19, the bus bar being enclosed within the groove by a layer of refractory cement 27. A pair of spaced apart clamping devices, such as banding clamps 31 is provided around the periphery of the long leg 20 of the holder 17 for holding the bus bar 19 in place.

Figure 2:
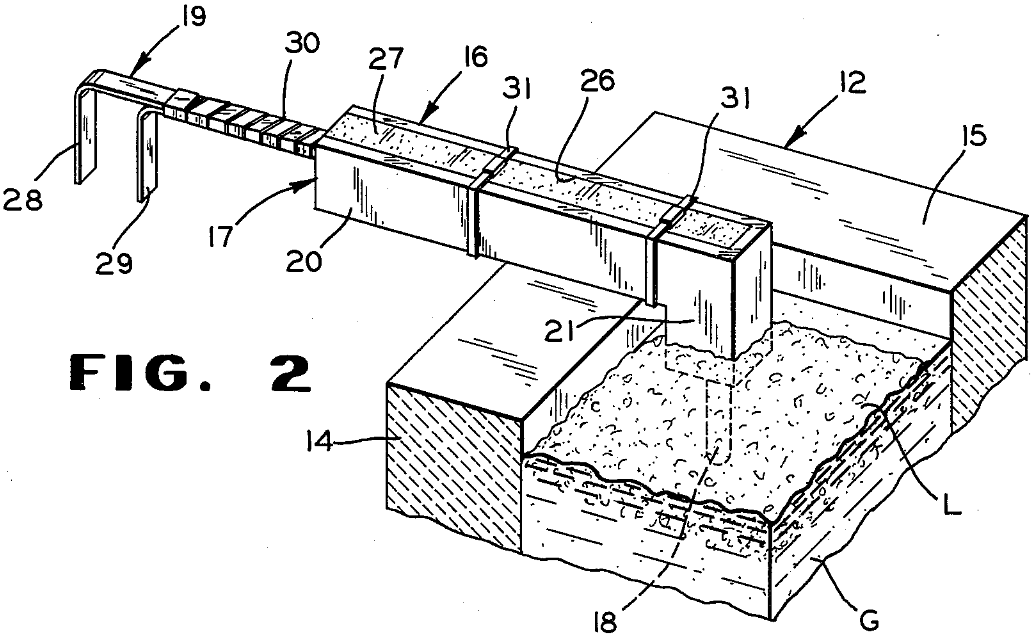
FIG. 2 is a fragmentary perspective view partly in section, of the heating device illustrated in FIG. 1.

As illustrated in FIGS. 2 and 3, the bus bar 19 preferably comprises two copper bars 28 and 29 silver soldered together. As best illustrated in FIG. 2, the bus bar 19 extends from the electrode 18 beyond the end of the long leg 20, with a portion of the exposed portion being covered by a wrapping 30 of thermal and electrical material such as asbestos for insulating the bus bar from the surrounding environment. The outer end of each copper bar 28 and 29 may be bent as illustrated in FIG. 2 or otherwise suitably formed for connection to a source of electrical energy (not shown).

In the installation illustrated in FIG. 1, a pair of holders 17 rests on the top of the doghouse walls, and the electrodes 18 extend downwardly into the body of molten glass G. As is known, heated electrodes exposed to the air are readily oxidizable, and thus the short leg 21 which jackets the electrode 18 is of sufficient length to extend through the blanket of unmelted batch material so that the electrode is not exposed. Preferably, the short leg 21 also is designed to extend over a sufficient portion of the length of the electrode 18 so that the lower end of the leg will be immersed at all times in the molten glass while it is in operating positions supplying auxiliary heat to cool areas of the doghouses 13 and 14. This design is preferred, since it has been found that such heating devices are subjected to accelerated wear at points thereon corresponding to the juncture between the batch line and the molten glass level due to chemical effect on them of entrapped gases between the molten glass and the batch blanket. Accordingly, as illustrated in FIG. 3, when the long leg 20 of the holder 17 rests on the top surface of the doghouse walls, the short leg 21 is of sufficient length to project through the overlying layer of batch material into the molten glass whereby the upper portion of the electrode 18 is sheathed in a refractory jacket which extends through the batch blanket and into the top level of the body of molten glass. Accordingly, the jacket protects the electrode in the region near the top surface level of the batch blanket against chemical attack.

It is to be understood that the form of the invention herewith shown and described, is to be taken as an illustrative embodiment of the same, and that various changes in the shape, size and arrangement of the parts may be resorted to without departing from the spirit of the invention.

We claim:

1. A heating device including an electrode for mounting from the top surface of a doghouse wall of a glass melting furnace containing a body of molten glass, comprising:

a. a supporting member having a first portion for sitting on the top surface of the doghouse wall and a second portion for extending into the body of molten glass in the doghouse;
b. a bus bar mounted within said first portion and extending from said second portion beyond the free end of said first portion for connection to a source of electrical energy;
c. said electrode being elongated and having an end mounted within said second portion, and an end extending therefrom for projecting into the body of molten glass; and
d. means operatively connecting said bus bar to the end of said electrode mounted within said supporting member.

2. A heating device including an electrode for mounting from the top surface of a doghouse wall as claimed in claim 1, wherein said supporting member comprises an L-shaped member of refractory material and said first and said second portions are the long and short legs respectively of said L-shaped member, said long leg having a groove for receiving said bus bar and said short leg having a central aperture for receiving said electrode and defining a jacket for the upper portion thereof protecting the electrode against corrosion and oxidation.

3. A heating device including an electrode for mounting from the top surface of a doghouse wall as claimed in claims 1 or 2, wherein said bus bar is encased within said first portion of said supporting member by a layer of refractory cement.

4. A heating device including an electrode for mounting from the top surface of a doghouse wall as claimed in claims 1 or 2, wherein said means for operatively connecting said electrode to said bus bar comprises a nut fixedly attached to the end of said bus bar within said supporting member and an end of said electrode is provided with threads for attachment to said nut.

5. A heating device including an electrode for mounting from the top surface of a doghouse wall as claimed in claims 1 or 2, wherein the portion of said bus bar extending beyond said first portion of said supporting member is wrapped with an insulating material.

6. A heating device including an electrode for mounting from the top surface of a doghouse wall as claimed in claim 1, including means for holding said bus bar in place within said first portion.

7. A heating device including an electrode for mounting from the top surface of a doghouse wall as claimed in claim 6, wherein said holding means comprises a pair of spaced-apart banding clamps.

* * * * *